United States Patent [19]
Dupuy

[11] Patent Number: 5,535,423
[45] Date of Patent: Jul. 9, 1996

[54] METHOD OF EXCHANGING DATA BETWEEN A BASE TRANSCEIVER STATION OF A MOBILE RADIO NETWORK AND A MOBILE IN THE NETWORK

[75] Inventor: Pierre Dupuy, Paris, France

[73] Assignee: Societe Anonyme Dite Alcatel Radiotelephone, Paris, France

[21] Appl. No.: 249,833

[22] Filed: May 26, 1994

[30] Foreign Application Priority Data

May 28, 1993 [FR] France .................................. 93 06426

[51] Int. Cl.⁶ ................................ H04Q 7/00; H04Q 9/00
[52] U.S. Cl. ........................ 455/33.1; 455/54.1; 455/56.1
[58] Field of Search ................................ 455/33.1, 33.2, 455/33.3, 33.4, 54.1, 56.1, 62, 67.1; 379/58, 59, 60; 370/95.3

[56] References Cited

U.S. PATENT DOCUMENTS

| | | | |
|---|---|---|---|
| 4,723,266 | 2/1988 | Perry | 379/60 |
| 5,212,830 | 5/1993 | Miller | 455/33.3 |
| 5,228,029 | 7/1993 | Kotzin | 455/56.1 |
| 5,262,263 | 11/1993 | Ramsdale et al. | 455/54.1 |
| 5,379,447 | 1/1995 | Bonta | 455/33.2 |
| 5,404,355 | 4/1995 | Raith | 455/54.1 |
| 5,430,761 | 7/1995 | Bruckert et al. | 455/33.1 |
| 5,432,780 | 7/1995 | Smith | 455/33.1 |
| 5,432,843 | 7/1995 | Bonta | 455/33.2 |
| 5,448,753 | 9/1995 | Ali et al. | 455/33.1 |
| 5,455,962 | 10/1995 | Kotzin | 455/33.1 |

FOREIGN PATENT DOCUMENTS

| | | |
|---|---|---|
| 480505A1 | 4/1992 | European Pat. Off. . |
| 2211699 | 7/1989 | United Kingdom . |
| WO8400654 | 2/1984 | WIPO . |

OTHER PUBLICATIONS

S. Halpern "Alternatives in Cellular System Design for Serving Portables", *34th IEEE Vehicular Technology Conference Pittsburgh*—May 21, 1984—pp. 162–167.
French Search Report FR 9306426.

*Primary Examiner*—Reinhard J. Eisenzopf
*Assistant Examiner*—Marsha D. Banks-Harold
*Attorney, Agent, or Firm*—Sughrue, Mion, Zinn, Macpeak & Seas

[57] ABSTRACT

A base transceiver station of a GSM type cellular network exchanges data by radio with mobiles in a specific geographical area or main cell divided into a plurality of sectors each corresponding to a specific portion of the main cell and each associated with a receiver having a directional antenna. The base transceiver station includes a single transmitter having an omni-directional antenna and providing the transmit radio coverage of all the sectors so that the data transmitted by the base transceiver station in the form of radio signals to a mobile in any sector is transmitted by the transmitter.

7 Claims, 2 Drawing Sheets

METHOD OF EXCHANGING DATA BETWEEN A BASE TRANSCEIVER STATION OF A MOBILE RADIO NETWORK AND A MOBILE IN THE NETWORK

BACKGROUND OF THE INVENTION

1. Field of the Invention

The present invention concerns a method of exchanging data between a base transceiver station of a mobile radio network, for example a GSM (Global System for Mobile communications) network, and a mobile in the network.

2. Description of the Prior Art

A cellular mobile radio network includes a plurality of geographically dispersed base transceiver stations. Each base transceiver station provides radio coverage of a specific geographical area or cell. Each base transceiver station is usually at the center of the respective cell; the expression Base Transceiver Station is abbreviated to BTS.

Thus the overall coverage area is divided into cells and a mobile (such as a mobile telephone, for example) in the area covered by a network of base transceiver stations can at all times exchange data (usually speech) and signalling by radio with the base transceiver station of the cell in which it is currently located.

When a mobile user wishes to set up a call to another mobile user or a fixed user, i.e. to transmit and receive speech, the respective base transceiver station acts as a relay station and to this end has at least one transmitter and at least one receiver associated with at least one antenna.

The BTS antenna can be an omni-directional antenna transmitting high power signals in all directions.

However, signals received by a non-directional antenna are of poorer quality than signals received by a highly directional antenna. Consequently, the signals transmitted by the mobiles must be transmitted at a high level in order to be usable by a BTS having an omni-directional antenna.

The level at which mobiles transmit is limited, among other reasons to increase the length of time for which they can operate between battery recharging, with the result that if they are too far from the center of the cell, reception at the BTS is poor, the signal being at too low a level to be distinguished from interference or noise.

One method of overcoming this drawback is to divide the cells, especially large area cells (having a radius in the order of several kilometers), into a plurality of sectors grouped around the BTS of the original cell, referred to as the main cell. In this way a cell can be divided into three, six or 12 sectors, for example, depending on its size, the communication traffic in the area it covers and the power output of the mobiles from which it must be able to receive.

Each sector then has a directional antenna, all these directional antennas being located at the same site, usually at the center of the main cell. For convenience, the combination of all the sectors will continue to be referred to as a cell, although each sector in fact constitutes an independent cell in the sense as defined above.

Two main types of data, of the kind exchanged on the ISDN (Integrated Services Digital Network) can be exchanged between a mobile and the base transceiver station of the cell in which it is located:

- speech (or computer) data, and
- signalling and control data, which includes information enabling the mobile to access the cellular network or to maintain a call in progress on changing from one cell to another ("Handover").

Thus each main cell is associated with a set of frequencies comprising at least: a frequency known as the downward control channel for transmitting general signalling data in the downward direction (i.e. in the direction from the base transceiver station to the mobile), the downward control channel being associated with a frequency known as the upward control channel for transmitting general signalling data in the upward direction (i.e. in the direction from the mobile to the base transceiver station). In GSM terminology control channels are called Broadcast Control Channels (BCCH).

Either channels not used for signalling on the upward and downward control channels or, if communication traffic in the cell is greater, at least one downward traffic frequency forming a frequency pair with an upward traffic frequency can be used to transmit speech or computer data.

In this case the frequencies of the upward and downward control channels and the upward and downward traffic frequencies are all different.

In the case of sectors of a large area cell with low traffic, an upward control channel and a downward control channel are associated with each sector and each sector is therefore provided with a transmitter and a receiver. These two frequencies can be sufficient in themselves to carry signalling and traffic in each sector.

Because GSM cellular networks employ Time-Division Multiple Access (TDMA), when a mobile accesses the cellular network it is assigned a traffic channel (TCH) corresponding to a transmit time slot reserved for it on the upward control channel (or on a specific upward traffic frequency if there is one). It is assigned a corresponding traffic channel for receiving on the downward control channel (or on the downward traffic frequency paired with the upward traffic frequency if there is one). The upward traffic channel is shifted in time relative to the downward traffic channel.

In a GSM network it is possible in practice to use eight channels per frequency. The time slots of the control channel not used for general signalling of the cell are also available for traffic and there are usually therefore seven traffic channels on the control channel in addition to the signalling channel.

In rural regions, where the cells usually cover a large area, and are therefore divided into sectors, many traffic channels are therefore available (since there is at least one pair of control frequencies per sector) and in practice very few are used because of the very low call density. The availability of at least one pair of control frequencies per sector requires each sector to be provided with a transmitter and a receiver.

Consequently, the equipment overhead is high for a low use of capacity, with the result that investment in a system of this kind is not cost effective.

Document WO 84/00654 describes a base transceiver station which solves this problem; it includes a single transmitter with an omni-directional antenna providing transmit radio coverage for all the sectors, so that the data transmitted by the base transceiver station by radio to a mobile in any of the sectors is invariably transmitted by this transmitter.

According to document WO 84/00654 the checks required when accessing a mobile station or on handover (i.e. when changing cell) are carried out by the base transceiver station itself. This makes the base transceiver station complex and costly. An object of the present invention is to remedy this problem.

SUMMARY OF THE INVENTION

To this end the present invention proposes a method of exchanging data between, firstly, a base transceiver station of a cellular mobile radio network adapted to exchange data by radio with mobiles in a delimited geographical area called the main cell, said main cell covering a plurality of sectors each corresponding to a specific portion of said main cell and each associated with a receiver having a directional antenna, said base transceiver station including a single transmitter having an omni-directional antenna and providing transmit radio coverage for all said sectors and, secondly, a mobile in said main cell, said exchange of data being adapted to establish a radio link between said mobile and said base transceiver station so that a traffic channel on an upward traffic frequency and a traffic channel on a downward traffic frequency are assigned to said mobile for transmission of speech or computer data, said method comprising the following operations:

- said mobile transmits at least one connection request or access request to said base transceiver station on a specific access channel on an upward control channel,
- a base station controller controlling said base transceiver station determines, for each of said receivers, the level and/or quality of the access signal constituted by said request and received at each of said receivers and in this way selects whichever of said receivers for which the access signal has the best quality and/or the best level as the receiver to be used for speech or computer data signals transmitted by said mobile,
- an upward traffic channel is assigned to said mobile for its exclusive use on said upward traffic frequency,
- a respective downward traffic channel is assigned to said mobile on said downward traffic frequency, said downward traffic channel being shifted in time relative to said upward traffic channel, and
- each of the other mobiles in said main cell and connected to said base transceiver station is associated with a downward traffic channel on said downward traffic frequency shifted in time relative to all the traffic channels assigned to the other mobiles on said downward traffic frequency and to an upward traffic channel on said upward traffic frequency shifted in time relative to all the traffic channels assigned to the other mobiles on said upward traffic frequency.

This method is advantageous because it enables the base station controller to control access directly, which considerably simplifies the operations to be carried out by the base transceiver station. This is of particular benefit as the base transceiver station can then be simplified to what is strictly necessary, i.e. comprise virtually no more than a receiver. This results in a clear reduction in the equipment overhead.

A method as defined above and additionally adapted to maintain access of said mobile to said base transceiver station when said mobile moves from an old sector to a new sector includes the following operations:

- during the time slot corresponding to the upward traffic channel assigned to said mobile each of said receivers, including the old receiver used for the speech or computer data signals transmitted by said mobile, receives the speech or computer data signals transmitted by said mobile,
- after demodulation of each of said speech or computer data signals, the signal obtained by combining said speech or computer data signals is shifted into the base band and transmitted to said base station controller, and
- communication continues on the same upward traffic channel via a new receiver.

Another method of exchanging data and further adapted to maintain access of said mobile to said base transceiver station when said mobile moves from an old sector to a new sector includes the following operations:

- during the time slot corresponding to the upward traffic channel assigned to said mobile, each of said receivers, including the old receiver used for the speech or computer data signals transmitted by said mobile, receives the speech or computer data signals transmitted by said mobile,
- the speech or computer data signals from each of said receivers are shifted into the base band and then transmitted to said base station controller,
- said base station controller interrupts communication and, using one or more predetermined criteria, selects the receiver to be used for further communication and thus for said speech or computer data signals from said mobile to said base station controller,
- communication is established again on the same upward traffic channel, and
- the speech or computer data signals and signalling data signals from said mobile and from said selected receiver are shifted into the base band and then transmitted to said base station controller.

The criterion used can be the receive level at each receiver or the quality of the signal from each receiver, before or after decoding, or a combination of these two criteria.

The last two methods defined above make provision for handover.

In conventional handover methods the mobile determines the quality of the signal received on the downward control channel of each neighboring cell at all times. This is not possible when using a base transceiver station as described in document WO 84/00654 as there is only one downward control channel for this main cell. The above methods enable the connection to be maintained using a method other than measuring the quality of the downward control channel.

The invention also concerns a base transceiver station and a base station controller adapted to implement the above methods.

Other features and advantages of the present invention emerge from the following description of one embodiment of a the present invention given by way of non-limiting illustrative example only.

DETAILED DESCRIPTION OF THE PREFERRED EMBODIMENT

Components common to all the figures are always identified by the same reference numbers.

Figure 1:
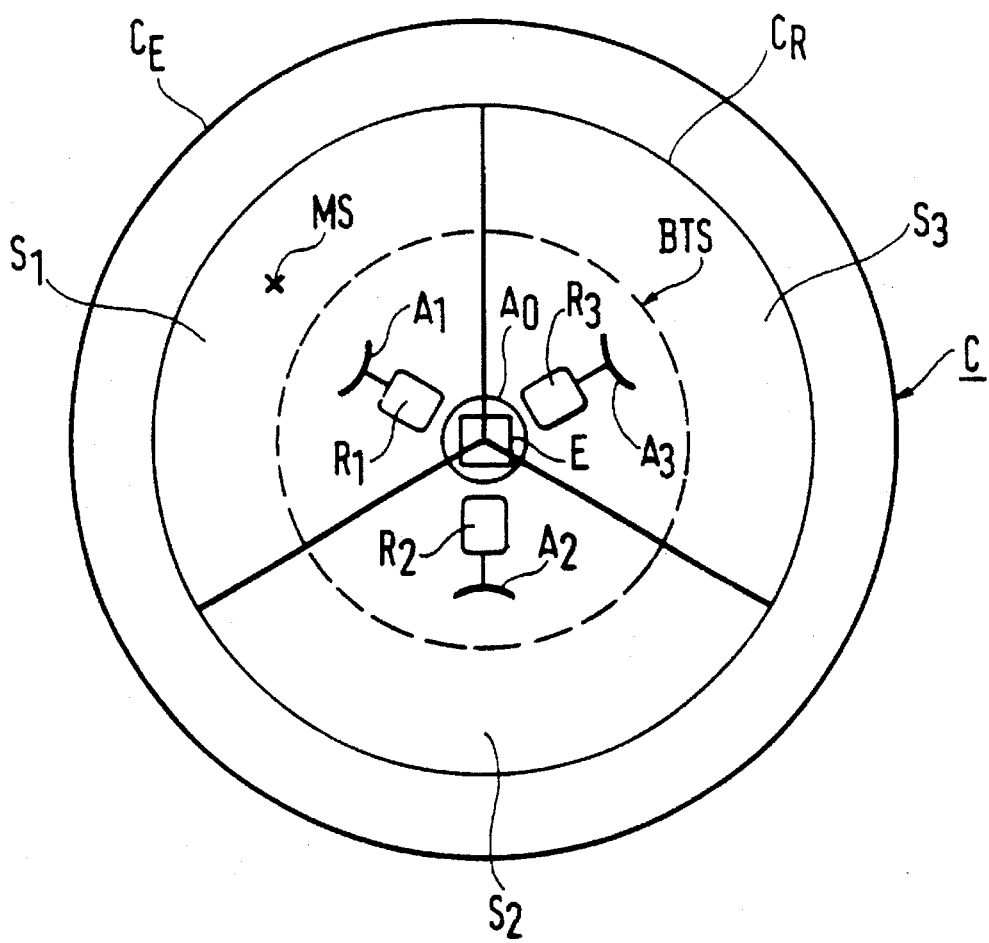
FIG. 1 is a schematic representation of the configuration of a sectored cell corresponding to the geographical coverage area of a base transceiver station as described in document WO 84/00654.

FIG. 1 is a schematic representation of a main cell C corresponding to the geographical coverage area of a base transceiver station BTS as described in document WO 84/00654.

For simplicity, in this example the cell C is regarded as circular and the base transceiver station BTS is at its center.

The cell C is divided into a plurality of sectors, in this example three sectors $S_1$, $S_2$ and $S_3$.

Broadly speaking, the base transceiver station BTS comprises:

- a transmitter E with an omnidirectional antenna $A_0$, and
- three receivers $R_1$, $R_2$ and $R_3$ each with a directional antenna $A_1$, $A_2$ and $A_3$ providing the respective radio coverage of the sectors $S_1$, $S_2$ and $S_3$.

For clarity the receivers $R_1$, $R_2$ and $R_3$ are shown slightly offset from the transmitter E, but it is obvious that all these components are located at substantially the same site to constitute the base transceiver station BTS. The combination of the receivers and the single transmitter constitutes the base transceiver station.

The coverage area of the base transceiver station BTS is not the same in both transmission directions (the upward direction and the downward direction). In the downward direction the cell C is equivalent to an unsectored cell with a single transmitter.

Broadly speaking, in the upward direction the cell C is equivalent to a sectored cell with one receiver per sector.

This is why two different contours have been shown for the cell C:

- a first contour $C_E$ defining the cell for transmission in the downward direction,
- a second contour $C_R$ defining the cell for transmission in the upward direction.

For clarity the contours $C_E$ and $C_R$ are not coincident in the figure, but it is to be understood that in practice they are coincident.

The frequencies available for exchange of data in the cell C are as follows:

- a downward traffic frequency for conveying speech or computer data from the base transceiver station BTS to one or more mobiles MS,
- a downward signalling frequency (i.e. a downward control channel) separate from the downward traffic frequency,
- an upward traffic frequency for conveying speech or computer data from the mobiles MS to the base transceiver station BTS, the upward traffic frequency being separate from the downward control channel and the downward traffic frequency, and
- an upward signalling frequency (i.e. an upward control channel) different from the other three frequencies just defined.

Of course, when the traffic is low the two signalling frequencies may be sufficient in themselves, as mentioned above.

Figure 2:
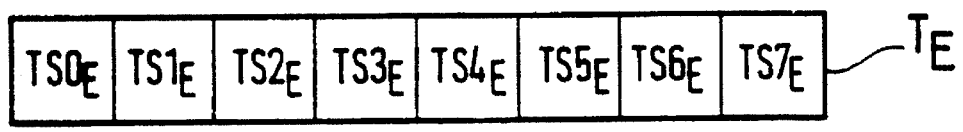
FIG. 2 shows the time structure of the broadcast channel and the downward traffic channels.

FIG. 2 shows in a very simplified form the time structure of the various traffic channels conveyed on the downward traffic frequency and the broadcast channel conveyed on the downward control channel and used to transmit to all the mobiles MS in the cell C signalling and control data (including information that the mobiles need to access the base station BTS, synchronization information, control information, etc).

Figure 3:
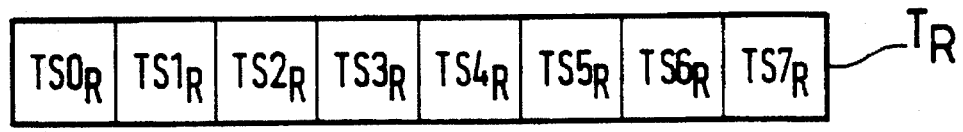
FIG. 3 shows the time structure of the access channel and upward traffic channels.

FIG. 3 shows in a likewise highly simplified form the time function of the various traffic channels conveyed on the upward traffic frequency and the random access channel (RACH) conveyed on the upward control channel and used to transmit signalling data (consisting of access requests from the mobiles MS) to the base transceiver station BTS.

Generally speaking, any channel is constituted by the periodic repetition of a time slot at a specific frequency, the period and the frequency depending on the type of channel concerned. In practice, time is divided into frames each of which is divided into eight time slots.

The base transceiver station BTS uses a frame $T_E$ as shown in FIG. 2 to transmit; the frame $T_E$ is divided into eight time slots $TS0_E$ through $TS7_E$. Time slot $TS0_E$ is assigned to the broadcast channel conveyed by the downward control channel, directed to all the mobiles in the cell C, and time slots $TS1_E$ through $TS7_E$ are assigned to the downward traffic channels. A separate downward traffic channel is assigned to each mobile in the cell C.

The period between two $TS0_E$ type time slots is greater than that between two time slots assigned to a given downward traffic channel, i.e. to a given mobile, with the result that seven or eight mobiles can receive radio signals from the base transceiver station BTS on the downward traffic frequency.

FIG. 3 shows a frame $T_R$ used by the base transceiver station BTS to receive from any of the sectors $S_1$, $S_2$ and $S_3$; the frame structure is the same in each of the three sectors.

The frame $T_R$ is divided into eight time slots $TS0_R$ through $TS7_R$. The time slot $TS0_R$ is assigned to the access channel conveyed by the upward control channel and can therefore be used by any mobile MS anywhere in cell C.

The time slots $TS1_R$ through $TS7_R$ are assigned to the upward traffic channels. Unlike the access channel, a separate upward traffic channel is assigned to each mobile MS. The periods at which the access channel and the downward traffic channels repeat are such that seven or eight mobiles can send radio signals on this traffic frequency.

Consider now the method in accordance with the invention whereby a mobile MS can exchange with the base transceiver station BTS data enabling it to access the BTS.

As is conventional in the GSM system, if a mobile wishes to access the network via a base transceiver station, i.e. to be assigned an upward traffic frequency and a downward traffic frequency and a traffic channel on each of these frequencies enabling it to communicate, it begins by determining the downward control channel it is receiving best (by measuring the receive level, for example; for this purpose the base transceiver station BTS of each sector or cell transmits a signal continuously on its downward control channel); it then transmits access request signals on the access channel of the associated upward control channel. When the access request from the mobile has been received, an upward traffic channel and downward traffic channel are assigned to the mobile.

In the conventional arrangement each cell or each sector has its own upward control channel with the result that the mobile can easily determine its current sector or cell by identifying the downward control channel it receives best. In this way access requests transmitted by the mobile on the upward control channel associated with the downward control channel received best are received only by the receiver associated with the sector of which this is the upward control channel. This is not the case with the FIG. 1 base transceiver station.

In this base transceiver station there is only one pair of control channels for the three sectors. Accordingly, the mobile sends one or more access requests on the upward control channel and each of the receivers $R_1$, $R_2$ and $R_3$ receives these access request(s).

To determine the sector for the mobile MS, and consequently to determine the receiver to be used for speech or computer data or signalling data signals transmitted by the mobile MS, the base station controller for the base transceiver station BTS determines the level and/or the quality of reception of the signal consisting of the access request at each of the receivers $R_1$, $R_2$ and $R_3$. The receiver chosen is that at which the access request is received at the best quality and/or level.

When the receiver has been determined the traffic channel assigned to the mobile MS on the upward traffic frequency, i.e. in practice the number of the time slot reserved for it to transmit radio signals, is determined according to which upward traffic channels are already in use by other mobiless only one upward traffic channel corresponding to a time slot not yet used can be assigned to the mobile. Furthermore, time slot 0 is assigned to the access channel with a repetition period greater than that of the traffic channels so that it can also be used for a traffic channel.

To enable speech or computer data to be exchanged in the downward direction a traffic channel on the downward traffic frequency is also assigned to the mobile MS. This downward traffic channel is offset by several time slots (for example three time slots) relative to the respective upward traffic channel.

In practice the receiver chosen for the upward channel data is also that used for signalling data from the mobile. The other receivers are also capable of receiving the speech or computer data and signalling data from the mobile but are used only to choose the best receiver, as is explained below in connection with handover.

Another method which needs to be described in the context of the invention is that for maintaining the call in progress when the mobile MS moves from the sector $S_1$ to the sector $S_2$, for example.

For convenience this method is called "handover" hereinafter, although this is not strictly accurate (see below).

In conventional handover the mobile measures the receive level on the downward control channel of each of the neighbouring cells and regularly sends the results of these measurements to the current base transceiver station on a Slow Associated Control Channel (SACCH). A base station controller (BSC) controlling a certain number of base transceiver stations, including the current base transceiver station of the mobile, can then determine when it is appropriate to handover the mobile. For simplicity, if the receive level of the downward control channel associated with the mobile's current cell is less than the receive level of the downward control channel of a neighbouring cell, handover is begun.

In the case of the FIG. 1 base transceiver station, this conventional procedure cannot be used as there is only one downward control channel for all the sectors.

As the receivers other than those of the mobile's current sector are not used by other mobiles in the time slot corresponding to the upward traffic channel used by the mobile, these receivers can also receive the signals transmitted by the mobile MS on the upward traffic frequency.

In practice there are various options open.

Figure 4:
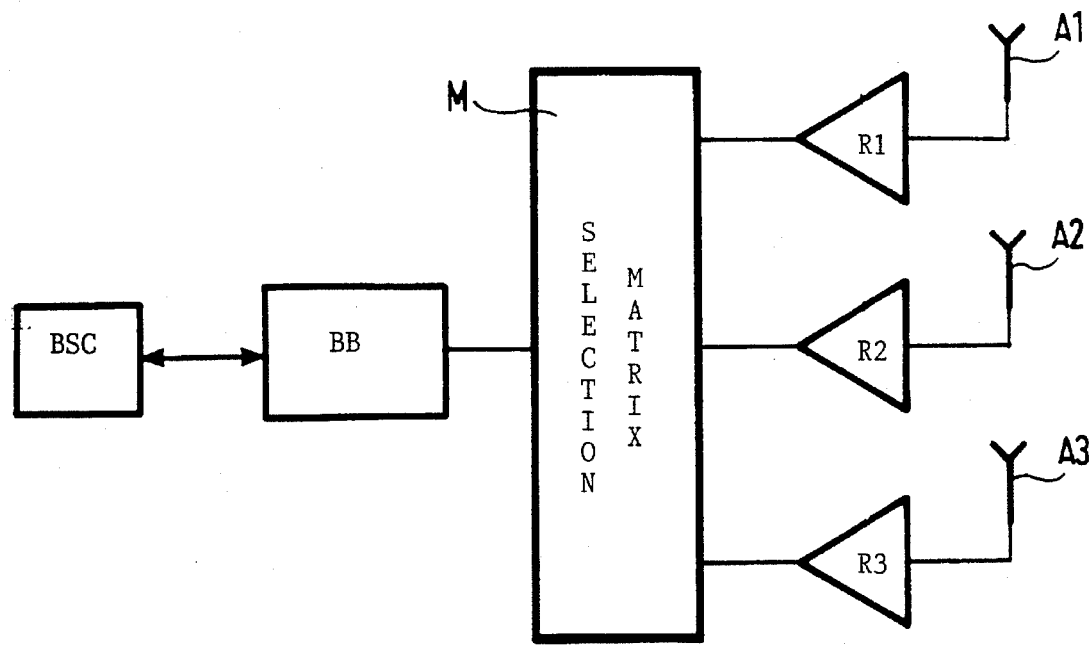
FIG. 4 is a diagram showing the method of selecting the receiver used for continuing the call on handover.

In a first option, "handover" can be decided on locally, at the base transceiver station BTS: the BTS selects whichever of the receivers $R_1$, $R_2$ and $R_3$ is to be used for the signals transmitted by the mobile MS. FIG. 4 shows that a selection operation is conducted within the BTS by means of a selection "matrix" M at the output of the receivers $R_1$, $R_2$ and $R_3$. The matrix M selects the receiver to be used by applying one or more predetermined criteria to choose which of the signals from the three receivers $R_1$, $R_2$ and $R_3$ will actually be transmitted. The selected signal is then shifted into the base band by the device BB and passed to a base station controller BSC controlling the base transceiver station BTS and enabling the message to be transmitted to its destination.

A first selection criterion can entail selecting the receiver which receives from the mobile the best, i.e. that which receives the signals at the highest power, for example, or that which receives the signals with the best quality, as determined before or after decoding. Selection can equally well be based on a combination of the foregoing two criteria.

The call in progress then continues through the selected receiver, i.e. in practice the signal transmitted, whether containing speech or computer data or signalling data, is that from the selected receiver. The other receivers continue to receive signals transmitted by the mobile so that the above selection procedure can be carried out whenever necessary.

In this way it is possible to decide whether a selection operation as described above is needed for each time interval. In particular, this facility can be retained if the selection matrix M can determine the best of the three receivers very quickly, for example by delaying the signals received sufficiently to measure their level.

In another selection mode the signals received by the three receivers are combined within the selection matrix M after demodulating the signals, using a principle similar to antenna diversity. The combined signal is transmitted to the BSC via the device BB.

The first option as just described is "transparent" to the mobile, i.e. the mobile is passive during "handover" (here the term handover is in quotes because the procedure is not properly speaking that known as handover; in conventional handover, the traffic frequency assigned to the mobile changes and the BSC initiates this change).

Figure 5:
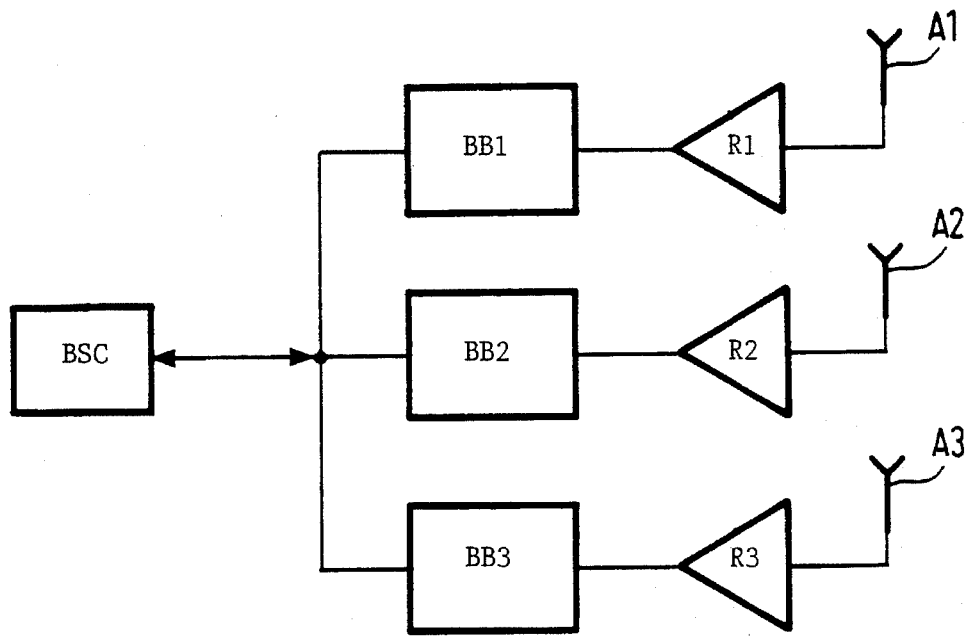
FIG. 5 is a diagram showing a variant of the FIG. 4 selection method.

In a second option, which is not transparent for the mobile, handover is effected by means of the BSC. Referring to FIG. 5, the signals from the receivers $R_1$, $R_2$ and $R_3$ are shifted into the base band by means of devices $BB_1$, $BB_2$ and $BB_3$ and the receiver to be used to continue the call is selected in the BSC after the call in progress is interrupted. This receiver is that used to transmit both speech or computer data and signalling data from the mobile MS; the other receivers continue to receive the signals transmitted by the mobile, but are only used to carry out the selection effected by the BSC according to the signal level and/or quality.

As with conventional handover, the BSC thus sends control messages to the mobile, in particular to request it to establish the connection again after the handover, although without changing traffic channel. Once again the handover is not handover in the usual sense since the call frequency does not change and the connection is established again after handover using the same traffic channel.

The advantage of this second option over the first is that the handover protocol in the base transceiver station is identical to that used in the conventional handover procedure with prior art base transceiver stations. In this case only the base station controller protocol is changed, with the result that the base transceiver station overhead is reduced.

Of course, the invention is not limited to the embodiment just described.

In particular, the invention applies not only to a GSM cellular network but equally to any other type of cellular network.

Also, although it has many advantages in its application to large area cells in rural areas, the invention can equally well be applied to base transceiver stations for cells with any coverage, given that it makes available a sufficient number of traffic channels for the expected call traffic.

The access and handover methods described in connection with a base transceiver station of the invention apply to a GSM cellular network. They can obviously be adapted to suit any type of cellular network without departing from the scope of the invention.

In the access method the selection of the receiver offering the best quality and/or the best level can be effected in the same manner as in the handover method of the invention, i.e. either by the BTS using the selection matrix M or by the BSC using procedures similar to those used for conventional handover.

To clarify the description these methods have been described with reference to an extremely simplified example of the organization of channels within the cell. The person skilled in the art is obviously able to adapt these methods to more complex channel structures without departing from the scope of the invention.

In particular, if the broadcast channel corresponding to time slot 0 is divided into a plurality of sub-channels, a first sub-channel reserved for broadcasting as described above and at least one second sub-channel reserved for a stand-alone dedicated control channel (SDCCH), to use GSM terminology, this second sub-channel cannot be used simultaneously in a plurality of separate sectors, unlike the broadcast sub-channel. On the other hand, a plurality of these sub-channels can be used in separate sectors.

Finally, any means can be replaced by equivalent means without departing from the scope of the invention.

There is claimed:

1. A method of exchanging data between a base transceiver station of a cellular mobile radio network and a mobile, wherein:

said base transceiver station and said mobile exchange data by radio in a delimited geographical area called a main cell which has a plurality of sectors, each corresponding to a specific portion of said main cell, and each associated with a receiver having a directional antenna;

said base transceiver station has only a single transmitter having an omni-directional antenna and providing transmit radio coverage for all said sectors;

said exchange of data occurs on a radio link between said mobile and said base transceiver station;

said radio link is defined by a traffic channel on an upward traffic frequency and a traffic channel on a downward traffic frequency which are assigned to said mobile for transmission of speech or computer data; and said method comprises the following operations:

transmitting at least one access request from said mobile to said base transceiver station on a specific access channel on an upward control channel, determining at a base station controller controlling said base transceiver station, for each of said receivers, the quality of the access signal constituted by said request and received at each of said receivers, selecting whichever of said receivers for which the access signal has the best quality as the receiver to be used for speech or computer data signals transmitted by said mobile, assigning an upward traffic channel to said mobile for its exclusive use on said upward traffic frequency, and assigning a respective downward traffic channel to said mobile on said downward traffic frequency, said downward traffic channel being shifted in time relative to said upward traffic channel, wherein each of the other mobiles in said main cell and connected to said base transceiver station is associated with a downward traffic channel on said downward traffic frequency shifted in time relative to all the traffic channels assigned to the other mobiles on said downward traffic frequency and to an upward traffic channel on said upward traffic frequency shifted in time relative to all the traffic channels assigned to the other mobiles on said upward traffic frequency.

2. Method of exchanging data according to claim 1 wherein said exchange of data maintains access of said mobile to said base transceiver station when said mobile moves from an old sector to a new sector, said method including the following operations:

receiving, during the time slot corresponding to the upward traffic channel assigned to said mobile each of said receivers, including the old receiver used for the speech or computer data signals transmitted by said mobile, the speech or computer data signals transmitted by said mobile, shifting, after demodulation of each of said speech or computer data signals, a signal obtained by combining said speech or computer data signals into the base band, transmitting said shifted signal to said base station controller, and continuing communication on the same upward traffic channel via a new receiver.

3. Method of exchanging data according to claim 1 wherein said exchange of data maintains access of said mobile to said base transceiver station when said mobile moves from an old sector to a new sector, said method then including the following operations:

receiving, during the time slot corresponding to the upward traffic channel assigned to said mobile, each of said receivers, including the old receiver used for the speech or computer data signals transmitted by said mobile, the speech or computer data signals transmitted by said mobile, shifting the speech or computer data signals from each of said receivers into the base band, then transmitting said shifted signals to said base station controller, interrupting communication and, using one or more predetermined criteria, selecting the receiver to be used for further communication and thus for said speech or computer data signals from said mobile to said base station controller, establishing communication again on the same upward traffic channel, and shifting the speech or computer data signals and signalling data signals from said mobile and from said selected receiver into the base band, and then transmitting said shifted signals to said base station controller.

4. Method according to claim 3 wherein one of said predetermined criteria is the receive level at each of said receivers.

5. Method according to claim 3 wherein one of said predetermined criteria is the quality of the signal from each of said receivers, before or after decoding.

6. A base station controller for controlling an exchange of data between a base transceiver station of a cellular mobile radio network and mobiles in a delimited geographical area called the main cell, said main cell covering a plurality of sectors each corresponding to a specific portion of said main cell and each associated with a receiver having a direction antenna, said base transceiver station including only a single transmitter having an omni-directional antenna and providing transmit radio coverage for all said sectors, said exchange of data occurring over a radio link between a mobile and said base transceiver station so that a traffic channel on an upward traffic frequency and a traffic channel on a downward traffic frequency are assigned to said mobile for transmission of speech or computer data, wherein, in the event of an access request transmitted from said mobile to said base transceiver station on a specific access channel on an upward control channel, said base station controller operates according to the steps of:

determining, for each of said receivers, the quality of the access signal constituted by said request and received at each of said receivers, selecting whichever of said receivers for which the access signal has the best quality as the receiver to be used for speech or computer data signals transmitted by said mobile, assigning an upward traffic channel to said mobile for its exclusive use on said upward traffic frequency, and assigning a respective downward traffic channel to said mobile on said downward traffic frequency, said downward traffic channel being shifted in time relative to said upward traffic channel, wherein each of the other mobiles in said main cell and connected to said base transceiver station is associated with a downward traffic channel on said downward traffic frequency shifted in time relative to all the traffic channels assigned to the other mobiles on said downward traffic frequency and to an upward traffic channel on said upward traffic frequency shifted in time relative to all the traffic channels assigned to the other mobiles on said upward traffic frequency.

7. A base transceiver station of a cellular mobile radio network which exchanges data by radio with mobiles in a delimited geographical area called a main cell, said main cell covering a plurality of sectors each corresponding to a specific portion of said main cell and each associated with a receiver having a directional antenna, said base transceiver station including only a single transmitter having an omni-directional antenna and providing transmit radio coverage for all said sectors, said exchange of data occurring over a radio link between said mobile and said base transceiver station so that a traffic channel on an upward traffic frequency and a traffic channel on a downward traffic frequency are assigned to said mobile for transmission of speech or computer data;

said base transceiver station performing the steps of:

receiving at least one access request from said mobile on a specific access channel on an upward control channel, transmitting to a base station controller controlling said base transceiver station the access request received by each of said receivers, receiving from said base station controller:

a receiver selection which indicates the receiver for which the access signal has the best quality as the receiver to be used for speech or computer data signals transmitted by said mobile, an upward traffic channel assignment indicating the channel to be used by said mobile for its exclusive use on said upward traffic frequency, and a downward traffic channel assignment indicating the channel to be used by said mobile on said downward traffic frequency, said downward traffic channel being shifted in time relative to said upward traffic channel, wherein each of the other mobiles in said main cell and connected to said base transceiver station is associated with a downward traffic channel on said downward traffic frequency shifted in time relative to all the traffic channels assigned to the other mobiles on said downward traffic frequency and to an upward traffic channel on said upward traffic frequency shifted in time relative to all the traffic channels assigned to the other mobiles on said upward traffic frequency.

\* \* \* \* \*